United States Patent [19]

Bounds

[11] Patent Number: 5,224,636
[45] Date of Patent: Jul. 6, 1993

[54] UTILITY RACK

[76] Inventor: Dayne L. Bounds, Rte. 3, Box 334A, Clarksdale, Miss. 38614

[21] Appl. No.: 850,841

[22] Filed: Mar. 13, 1992

[51] Int. Cl.$^5$ ............................................. B60R 9/00
[52] U.S. Cl. .............................. 224/42.44; 224/42.07; 224/281; 224/921
[58] Field of Search ................ 224/921, 42.43, 42.44, 224/42.03 A, 42.07, 42.08, 280, 281, 282

[56] References Cited

U.S. PATENT DOCUMENTS

| | | | |
|---|---|---|---|
| 2,394,447 | 2/1946 | Hemp | 224/42.07 |
| 3,251,520 | 5/1966 | Van Dyke et al. | 224/42.44 |
| 3,650,443 | 3/1972 | Haskett et al. | 224/42.03 A |
| 3,822,801 | 7/1974 | Morgan, Jr. | |
| 3,913,811 | 10/1975 | Spencer | 224/42.08 |
| 4,099,760 | 7/1978 | Mascotte et al. | 293/73 |
| 4,221,311 | 9/1980 | Penn | 224/42.08 |
| 4,403,716 | 9/1983 | Carlson | 224/42.08 |
| 4,915,276 | 4/1990 | Devito | 224/42.43 |
| 5,033,662 | 7/1991 | Godin | 224/42.43 |

*Primary Examiner*—Linda J. Sholl
*Attorney, Agent, or Firm*—Walker, McKenzie & Walker

[57] ABSTRACT

A utility rack for being attached to a vehicle and for carrying a load. The rack includes a platform member for supporting the load; a first arm member having a first end for being attached to the vehicle and having a second end; a second arm member having a first end for being attached to the vehicle and having a second end; a first slide for slidably attaching the second end of the first arm member to the platform member; and a second slide for slidably attaching the second end of the second arm member to the platform member.

6 Claims, 2 Drawing Sheets

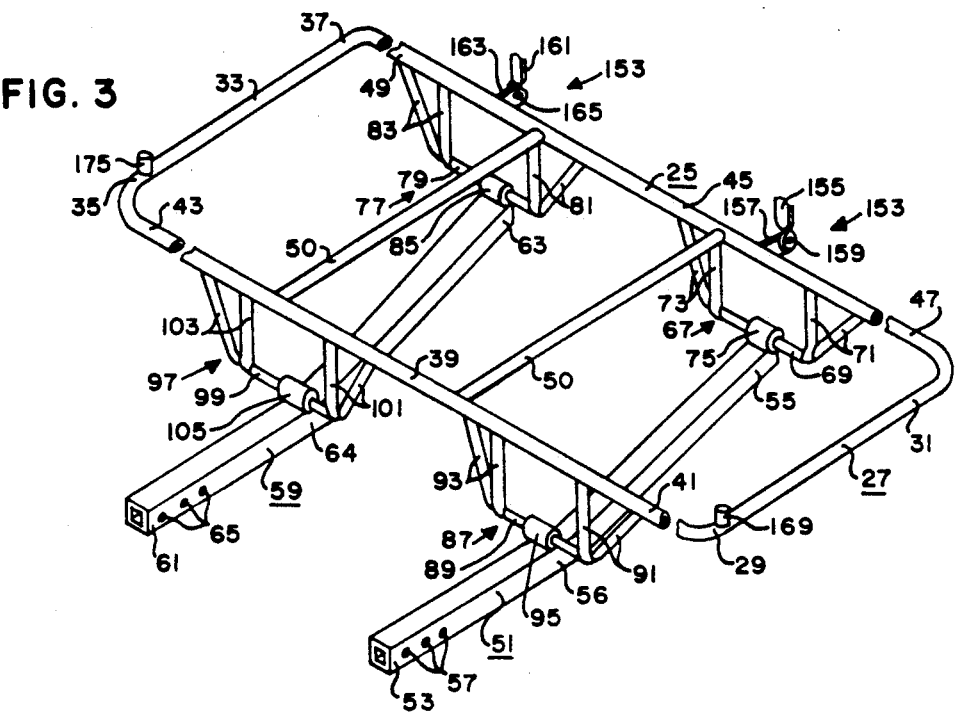

UTILITY RACK

BACKGROUND OF THE INVENTION

1. Field of the Invention

The present invention relates, in general, to utility racks for being attached to vehicles such as automobiles and the like.

2. Information Disclosure Statement

A preliminary patentability search conducted in class 224, subclasses 42.03, 42.07, 42.08 and 921 produced the following patents which may be relevant to the present invention:

Haskett et al., U.S. Pat. No. 3,650,443, discloses a wheelless carrier connectable to an automobile bumper and trailer hitch. A rectangular grid frame having a mesh screen fixed to its top surface is positioned above and extends out from the automobile bumper. A pair of bumper mounts mounted to the bumper are positioned on either side of a trailer hitch extending out beneath the bumper. Legs fixedly attached to the frame are lockingly received by the bumper mounts. A pair of cross struts have top ends fixed to the outer edge of the frame and extend downward and inward in a general V-shape having lower ends connected to a trailer hitch receiving device. A vertical member is fixedly mounted atop the trailer hitch receiving device and connected to the underside of the frame. An animal house having air vents and a hinged door is removably mounted atop the frame.

Morgan, U.S. Pat. No. 3,822,801, discloses a rack for loading and transporting an article, such as an animal carcass, which can be mounted on a vehicle bumper. The rack includes a tubular frame and tubular cross-members bent in a V-shaped forming two sections. Adjustable flexible straps connect opposite edges of the frame sections to a bumper permitting it to be raised from a ground-contacting loading position to an article transporting position.

Spencer, U.S. Pat. No. 3,913,811, discloses a foldable utility platform for attachment to a standard carrier trailer hitch of an automobile or the like. The platform includes means for securing it in a horizontal carrying position or in an upright stored position.

Mascotte et al., U.S. Pat. No. 4,099,760, discloses a device for being pivotally mounted to the front of a vehicle to act as a grill and brush guard when in an up position and to act as a utility rack when in a down position. Mounts are provided for being secured onto the frame of the vehicle. Upper and lower stops are provided on the mounts. A rectangular frame member having a woven wire mesh secured thereon is provided. Pivots pivotally mount the frame member to the mounts n a manner si that portions of the frame member engage the upper and lower stops when the frame member is in the up or down position. Securement is provided for securing the frame member in the up or down position against the up or down stops.

Penn, U.S. Pat. No. 4,221,311, discloses a luggage carrier comprising a pair of spaced apart bumper guards for mounting on the bumper of a motor vehicle, a luggage rack frame mounted between the bumper guards, the luggage rack frame being mounted so as to be pivotable on an axis parallel to the bumper from a horizontal position to a vertical storage position and further being removably mounted to one of the bumper guards and hingedly mounted to the other bumper guard so as to be pivotable about a substantially vertical axis from the horizontal use position to a horizontal removal or curb loading position allowing trunk or tailgate access.

Carlson et al., U.S. Pat. No. 4,403,716, discloses a support rack for automobiles and the like which is particularly adapted for alternate support and storage of bicycles in one position and for the storage of general materials such as trunks and the like in an alternate position. The storage rack includes a frame which in the bicycle supporting position is positioned in an upright attitude and in the general material supporting position is in a generally horizontal position.

The above patents do not disclose or suggest the present invention. More specifically, the above patents, taken as a whole, do not disclose or suggest a utility rack including platform means for supporting a load; a first arm member having a first end for being attached to a vehicle and having a second end; a second arm member having a first end for being attached to the vehicle and having a second end; first slide means for slidably attaching the second end of the first arm member to the platform means; and second slide means for slidably attaching the second end of the second arm member to the platform means.

SUMMARY OF THE INVENTION

The present invention is directed toward providing an improved utility rack for use with a vehicle to allow a load, such as a deer carcass, to be easily carried by the vehicle.

The utility rack of the present invention includes a platform means for supporting a load; a first arm member having a first end for being attached to a vehicle and having a second end; a second arm member having a first end for being attached to the vehicle and having a second end; first slide means for slidably attaching the second end of the first arm member to the platform means; and second slide means for slidably attaching the second end of the second arm member to the platform means.

BRIEF DESCRIPTION OF THE DRAWINGS

FIG. 3 is a perspective view of portions of the utility rack of the present invention with portions thereof broken away for clarity.

FIG. 4 is a somewhat diagrammatic sectional view as taken on line 4—4 of FIG. 2 with portions thereof omitted for clarity.

FIG. 5 is an exploded sectional view of a portion of the utility rack of the present invention.

FIG. 6 is a sectional view of a portion of the utility rack of the present invention.

FIG. 7 is a sectional view substantially as taken on line 7—7 of FIG. 6.

DESCRIPTION OF THE PREFERRED EMBODIMENT

Figure 1:
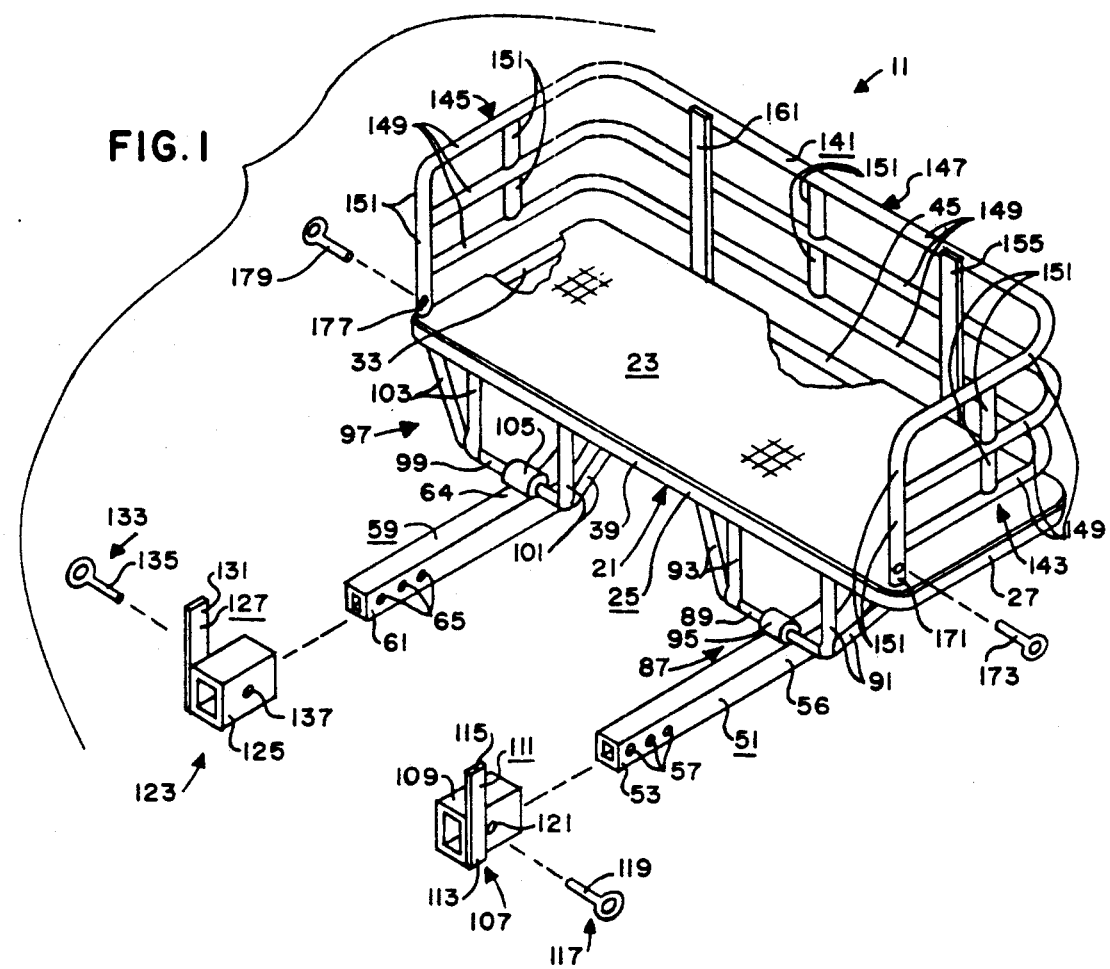
FIG. 1 is an exploded perspective view of the utility rack of the present invention.

The preferred embodiment of the utility rack of the present invention is shown in FIGS. 1-7 and identified by the numeral 11. The utility rack 11 is for use in combination with a vehicle 13 such as an automobile, truck, or the like and for carrying a load 15. The vehicle 13 preferably includes a chassis having a first chassis portion 17 and a second chassis portion 19. The first and second chassis portions 17, 19 may consist of various frame members located on the underside of the vehicle 13 to which trailer hitches and the like are frequently secured. The vehicle 13 preferably includes a rear bumper 20.

The utility rack 11 includes a platform means 21 for supporting the load 15. The platform means 21 preferably includes a substantially flat, planar support member 23 for receiving the load 15. The support member 23 is preferably constructed out of an open metal screen or the like for supporting a load 15 of substantial weight and bulk while allowing air to circulate therethrough. The platform means 21 preferably includes a rigid frame 25 for extending about the perimeter of the support member 23. The frame 25 preferably includes a first side member 27 having a first end 29 and a second end 31, a second side member 33 having a first end 35 and a second end 37, a first end member 39 having a first end 41 attached to the first end 29 of the first side member 27 and having a second end 43 attached to the first end 35 of the second side member 33, and includes a second end member 45 having a first end 47 attached to the second end 31 of the first side member 27 and having a second end 49 attached to the second end 37 of the second side member 33. Cross members 50 preferably extend between the end members 39, 45 substantially parallel to and spaced equal distance between the side members 27, 33 as clearly shown in FIG. 3. The side members 27, 33, end members 39, 45, and cross members 50 preferably consist of elongated, rigid metal pipes or the like welded or otherwise attached to one another to form an open rectangular frame member for supporting and strengthening the support member 23 as will now be apparent to those skilled in the art. The perimeter of the support member 23 is preferably welded or otherwise fixedly attached to the side members 27, 31 and end members 39, 45 as will now be apparent to those skilled in the art.

The utility rack 11 includes a first arm member 51 having a first end 53 for being attached to the vehicle 13 and having a second end 55. The first arm member 51 preferably consists of an elongated, rigid metal tube or pipe having a substantially square cross section (e.g., a 1.5 inch square metal tube) and having a plurality of spaced apart transverse apertures 57 extending therethrough substantially adjacent the first end 53 thereof. The second end 55 of the first arm member 51 is preferably angled upward from the first end 53 thereof as clearly shown in FIGS. 2 and 3 and for reasons which will hereinafter become apparent.

The utility rack 11 includes a second arm member 59 having a first end 61 for being attached to the vehicle 13 and having a second end 63. The second arm member 59 preferably consists of an elongated, rigid metal tube or pipe having a substantially square cross section (e.g., a 1.5 inch square metal tube) and having a plurality of spaced apart transverse apertures 65 extending therethrough substantially adjacent the first end 61 thereof. The second end 63 of the second arm member 59 is preferably angled upward from the first end 61 thereof as clearly shown in FIG. 3 and for reasons which will hereinafter become apparent. The second arm member 59 is preferably substantially identical to the first arm member 51.

The utility rack 11 includes a first slide means 67 for slidably attaching the second end 55 of the first arm member 51 to the platform means 21. The first slide means 67 preferably includes an elongated shaft member 69 having a first end and a second end; a first attachment means 71 for attaching the first end of the shaft member 69 to the platform means 21; a second attachment means 73 for attaching the second end of the shaft member 69 to the platform means 21; and a sleeve member 75 fixedly attached to the second end 55 of the first arm member 51 for slidably receiving the shaft member 69. The shaft member 69 and attachment means 71, 73 preferably consist of elongated, rigid metal pipes or the like welded or otherwise attached to one another and to the second side member 33 of the frame 25 with the longitudinal axis of the shaft member 69 parallel to and spaced below the longitudinal axis of the second side member 33 of the frame 25 as clearly shown in FIG. 3 as will now be apparent to those skilled in the art. The sleeve member 75 preferably consists of a short length of rigid metal pipe or the like welded to the second end 55 of the first arm member 51 with the longitudinal axis of the sleeve member 75 transverse to the longitudinal axis of the first arm member 51.

The utility rack 11 includes a second slide means 77 for slidably attaching the second end 63 of the second arm member 59 to the platform means 21. The second slide means 77 preferably includes an elongated shaft member 79 having a first end and a second end; a first attachment means 81 for attaching the first end of the shaft member 79 to the platform means 21; a second attachment means 83 for attaching the second end of the shaft member 79 to the platform means 21; and a sleeve member 85 fixedly attached to the second end 63 of the second arm member 59 for slidably receiving the shaft member 79. The shaft member 79 and attachment means 81, 83 preferably consist of elongated, rigid metal pipes or the like welded or otherwise attached to one another and to the second side member 33 of the frame 25 with the longitudinal axis of the shaft member 79 parallel to and spaced below the longitudinal axis of the second side member 33 of the frame 25 as clearly shown in FIG. 3 as will now be apparent to those skilled in the art. The sleeve member 85 preferably consists of a short length of rigid metal pipe or the like welded to the second end 63 of the second arm member 59 with the longitudinal axis of the sleeve member 85 transverse to the longitudinal axis of the second arm member 59.

The utility rack 11 preferably includes a third slide means 87 for slidably attaching the midportion 56 of the first arm member 51 to the platform means 21. The third slide means 87 preferably includes an elongated shaft member 89 having a first end and a second end; a first attachment means 91 for attaching the first end of the shaft member 89 to the platform means 21; a second attachment means 93 for attaching the second end of the shaft member 89 to the platform means 21; and a sleeve member 95 fixedly attached to the midportion 56 of the first arm member 51 for slidably receiving the shaft member 89. The shaft member 89 and attachment means 91, 93 preferably consist of elongated, rigid metal pipes or the like welded or otherwise attached to one another and to the first side member 27 of the frame 25 with the longitudinal axis of the shaft member 89 parallel to and spaced below the longitudinal axis of the first side member 27 of the frame 25 as clearly shown in FIG. 3 as will now be apparent to those skilled in the art. The sleeve member 95 preferably consists of a short length of rigid metal pipe or the like welded to the midportion 56 of the first arm member 51 with the longitudinal axis of the sleeve member 95 transverse to the longitudinal axis of the first arm member 51.

The utility rack 11 preferably includes a fourth slide means 97 for slidably attaching the midportion 64 of the second arm member 59 to the platform means 21. The second slide means 97 preferably includes an elongated shaft member 99 having a first end and a second end; a first attachment means 101 for attaching the first end of the shaft member 99 to the platform means 21; a second attachment means 103 for attaching the second end of the shaft member 99 to the platform means 21; and a sleeve member 105 fixedly attached to the midportion 64 of the second arm member 59 for slidably receiving the shaft member 99. The shaft member 99 and attachment means 101, 103 preferably consist of elongated, rigid metal pipes or the like welded or otherwise attached to one another and to the second side member 33 of the frame 25 with the longitudinal axis of the shaft member 99 parallel to and spaced below the longitudinal axis of the second side member 33 of the frame 25 as clearly shown in FIG. 3 as will now be apparent to those skilled in the art. The sleeve member 105 preferably consists of a short length of rigid metal pipe or the like welded to the midportion 64 of the second arm member 59 with the longitudinal axis of the sleeve member 105 transverse to the longitudinal axis of the second arm member 59.

The utility rack 11 preferably includes a first bracket means 107 for being attached to the first end 53 of the first arm member 51 and for being attached to the first chassis portion 17 of the chassis of the vehicle 13. The first bracket means 107 preferably includes a sleeve member 109 for slidably receiving the first end 53 of the first arm member 51. The sleeve member 109 may be constructed out of a rigid metal tube or pipe having a substantially square cross section and being sized to slidably receive the first end 53 of the first arm member 51. The first bracket means 107 may include a plate member 111 or the like having a first end 113 fixedly attached to the sleeve member 109 by welding or the like, and having a second end 115 fixedly attached to the first chassis portion 17 of the chassis of the vehicle 13 by welding or the like. The first bracket means 107 includes lock means 117 for locking the first end 53 of the first arm member 51 to the sleeve member 109. The lock means 117 preferably includes a pin member 119 for extending through the sleeve member 109 and the first end 53 of the first arm member 51. The sleeve member 109 preferably has a pair of transverse apertures 121 therethrough for receiving the pin member 119. The first end 53 of the first arm member 51 preferably has a plurality of spaced apart transverse apertures 57 therethrough for receiving the pin member 119 and for allowing adjustment of the first arm member 51 by aligning different sets of the apertures 57 with the apertures 121, as will now be apparent to those skilled in the art.

The utility rack 11 preferably includes a second bracket means 123 for being attached to the first end 61 of the second arm member 59 and for being attached to the second chassis portion 19 of the chassis of the vehicle 13. The second bracket means 123 preferably includes a sleeve member 125 for slidably receiving the first end 61 of the second arm member 59. The sleeve member 125 may be constructed out of a rigid metal tube or pipe having a substantially square cross section and being sized to slidably receive the first end 61 of the second arm member 59. The second bracket means 123 may include a plate member 127 or the like having a first end 129 fixedly attached to the sleeve member 125 by welding or the like, and having a second end 131 fixedly attached to the second chassis portion 19 of the chassis of the vehicle 13 by welding or the like. The second bracket means 123 includes lock means 133 for locking the first end 61 of the second arm member 59 to the sleeve member 125. The lock means 133 preferably includes a pin member 135 for extending through the sleeve member 125 and the first end 61 of the second arm member 59. The sleeve member 125 preferably has a pair of transverse apertures 137 therethrough for receiving the pin member 135. The first end 61 of the second arm member 59 preferably has a plurality of spaced apart transverse apertures 65 therethrough for receiving the pin member 135 and for allowing adjustment of the second arm member 59 by aligning different sets of the apertures 65 with the apertures 137, as will now be apparent to those skilled in the art.

The utility rack 11 preferably includes fence means 141 attached to the platform means 21 for surrounding at least a portion of the support member 23 and for at least partially enclosing the load 15. The fence means 141 preferably includes a first side fence portion 143 positioned above the first side member 27 of the frame 25 and extending between the first and second ends 29, 32 of the first side member 27 for preventing the load 15 from easily sliding off the first side member 27 of the frame 25; a second side fence portion 145 positioned above the second side member 33 of the frame 25 and extending between the first and second ends 35, 37 of the second side member 33 for preventing the load 15 from easily sliding off the second side member 33 of the frame 25; and an end fence portion 147 positioned above the second end member 45 of the frame 25 and extending between the first and second ends 47, 49 of the second end member 45 for preventing the load 15 from easily sliding off the second end member 45 of the frame 25. The fence means 141 is preferably constructed of a plurality of spaced apart, elongated rail members 149 normally extending around the first and second side members 27, 33 and the second end member 45 of the frame 25 as clearly shown in FIG. 1, and a plurality of cross members 151 extending between the individual rail members 149 to strengthen and reinforce the fence means 141 as will now be apparent to those skilled in the art. The rail members 149 and cross members 151 are preferably constructed out of rigid metal pipes or the like that are bent and welded into the desired shape as shown in FIG. 1, etc., as will now be apparent to those skilled in the art.

Figure 2:
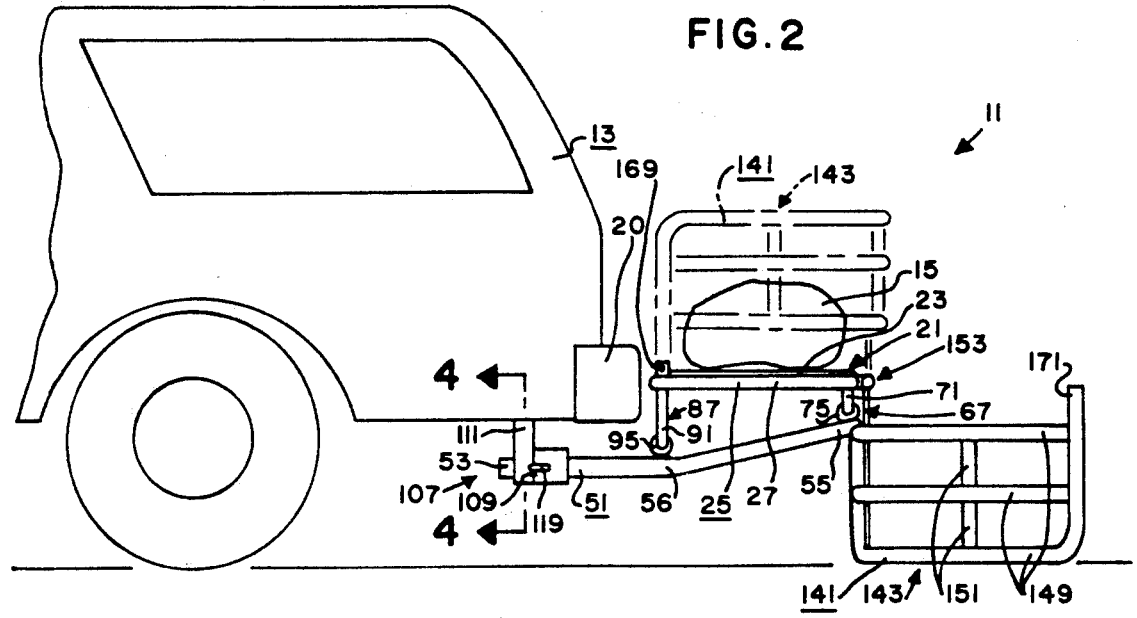
FIG. 2 is a side elevational view of the utility rack of the present invention shown attached to a vehicle.

The fence means 141 is preferably attached to the platform means 21 by means which allows the fence means 141 to move between a first position with the fence means 141 extending upwardly from the support member 23 of the platform means 21 as shown in solid lines in FIG. 1 and in broken lines in FIG. 2 to help secure the load 15 onto the support member 23, and a second position with the fence means 141 remote from the support member 23 of the platform means 21 as shown in solid lines in FIG. 2 to allow the load 15 to be easily moved onto or off of the support member 23 as will now be apparent to those skilled in the art. More specifically, the utility rack 11 preferably includes pivot means 153 for allowing the fence means 141 to be moved between the first and second positions. The pivot means 153 preferably includes a first leg member 155 for being fixedly attached to the second end fence portion 147 of the fence means 141, a first flange 157 for being fixedly attached to the second end member 45 of the frame 25 of the platform means 21, and a first pivot 159 for pivotally attaching one end of the first leg member 155 to the first flange 157. The pivot means 153 also preferably includes a second leg member 161 for being fixedly attached to the second end fence portion 147 of the fence means 141 a spaced distance from the first leg member 155, a second flange 163 for being fixedly attached to the second end member 45 of the frame 25 of the platform means 21 a spaced distance from the first flange 157, and a second pivot 165 for pivotally attaching one end of the second leg member 161 to the second flange 163. The leg members 155, 161 preferably consist of rigid, elongated metal straps or the like welded or otherwise fixedly attached to the fence means 141. The flanges 157, 163 preferably consist of rigid metal ears or the like welded or otherwise fixedly attached to the platform means 21. The pivots 159, 165 preferably consist of bolt means or the like extending through the respective leg members 155, 161 and flanges 157, 163.

The utility rack 11 preferably includes lock means 167 for locking the fence mean 141 in the first position. The lock means 167 preferably includes a first boss member 169 for being fixedly attached to the platform means 21 adjacent the first end 21 of the first side member 27 of the frame 25, a first socket means 171 for being fixedly attached to the distal end of the first side fence portion 143 of the fence means 141 and for receiving the first boss member 169 when the fence means 141 is in the first position, and a first pin means 173 for extending transversely through the first socket means 171 and the first boss member 169 to lock the fence means 141 to the platform means 21 in the first position. The lock means 167 also preferably includes a second boss member 175 for being fixedly attached to the platform means 21 adjacent the first end 35 of the second side member 33 of the frame 25, a second socket means 177 for being fixedly attached to the distal end of the second side fence portion 145 of the fence means 141 and for receiving the second boss member 175 when the fence means 141 is in the first position, and a second pin means 179 for extending transversely through the second socket means 177 and the second boss member 175 to lock the fence means 141 to the platform means 21 in the first position.

The operation and use of the present invention is quite simple. The bracket means 107, 123 are fixedly attached to the vehicle 13 at the desired location (e.g., to the first and second chassis portions 17, 19 adjacent the rear bumper 20 of the vehicle 13). The distance between the first and second arm members 51, 59 is then adjusted with the slide means 67, 77, 87, 97 until the first ends 53, 61 of the first and second arm members 51, 59 can be inserted into the respective sleeve members 109, 125. The first and second arm members 51, 59 are inserted into the respective sleeve members 109, 125 the desired distance (e.g., until the first end member 39 of the frame 25 is adjacent the rear bumper 20 of the vehicle 13 as shown in FIG. 2), and the pin members 119, 135 are inserted through the respective sleeve members 109, 125 and arm members 51, 59. To easily place the load 15 onto the support member 23 or remove the load 15 from the support member 23, the pin means 173, 179 are removed from the respective boss members 169, 175 and socket means 171, 177, and the fence means 141 is pivoted to the second position. Once the load 15 has been placed on or removed from the support member 23, the fence means 141 is pivoted back to the first position and the pin means 173, 179 are inserted through the respective boss members 169, 175 and socket means 171, 177 to lock the fence in the first position.

Although the present invention has been described and illustrated with respect to a preferred embodiment and a preferred use therefor, it is not to be so limited since modifications and changes can be made therein which are within the full intended scope of the invention.

I claim:

1. A utility rack for being attached to a vehicle and for carrying a load, said utility rack comprising:
 a) a platform means for supporting said load;
 b) a first arm member having a first end for being attached to said vehicle and having a second end;
 c) a second arm member having a first end for being attached to said vehicle and having a second end;
 d) first slide means for slidably attaching said second end of said first arm member to said platform means such that said platform means slides transversely to said first arm member; said first slide means including:
  (i) an elongated shaft member having a first end and a second end;
  (ii) a first attachment means for attaching said first end of said shaft member to said platform means;
  (iii) a second attachment means for attaching said second end of said shaft member to said platform means; and
  (iv) a sleeve member fixedly attached to said second end of said first arm member for slidably receiving said shaft member; and
 e) second slide means for slidably attaching said second end of said second arm member to said platform means such that said platform means slides transversely to said second arm member.

2. The utility rack of claim 1 in which said second slide means includes:
 a) an elongated shaft member having a first end and a second end;
 b) a first attachment means for attaching said first end of said shaft member to said platform means;
 c) a second attachment means for attaching said second end of said shaft member to said platform means; and
 d) a sleeve member fixedly attached to said second end of said second arm member for slidably receiving said shaft member.

3. A utility rack for being attached to a vehicle and for carrying a load, said utility rack comprising:
 a) a platform means for supporting said load;
 b) a first arm member having a first end for being attached to said vehicle and having a second end; said first arm member including a midportion;
 c) a second arm member having a first end for being attached to said vehicle and having a second end; said second arm member including a midportion;
 d) first slide means for slidably attaching said second end of said first arm member to said platform means;
 e) second slide means for slidably attaching said second end of said second arm member to said platform means;
 f) third slide means for slidably attaching said midportion of said first arm member to said platform means; said third slide means including:
  (i) an elongated shaft member having a first end and a second end;

(ii) a first attachment means for attaching said first end of said shaft member to said platform means;

(iii) a second attachment means for attaching said second end of said shaft member to said platform means; and (iv) a sleeve member fixedly attached to second end of said first arm member for slidably receiving said shaft member; and g) fourth slide means for slidably attaching said midportion of said second arm member to said platform means.

4. The utility rack of claim 3 in which said fourth slide means includes:

a) an elongated shaft member having a first end and a second end;

b) a first attachment means for attaching said first end of said shaft member to said platform means;

c) a second attachment means for attaching said second end of said shaft member to said platform means; and d) a sleeve member fixedly attached to said midportion of said second arm member for slidably receiving said shaft member.

5. A utility rack for being attached to a vehicle and for carrying a load, said utility rack comprising:

a) a platform means for supporting said load; said platform means including a support member for receiving said load; said platform means including a rigid frame, said frame including a first side member having a first end and a second end, a second side member having a first end and a second end, a first end member having a first end attached to said first end of said first side member and having a second end attached to said first end of said second side member, and includes a second end member having a first end attached to said second end of said first side member and having a second end attached to said second end of said second side member;

b) a first arm member having a first end for being attached to said vehicle and having a second end;

c) a second arm member having a first end for being attached to said vehicle and having a second end;

d) first slide means for slidably attaching said second end of said first arm member to said platform means;

e) second slide means for slidably attaching said second end of said second arm member to said platform means;

f) fence means attached to said platform means for surrounding at least a portion of said support member; said fence means including a first side fence portion for being positioned above said first side member of said frame of said platform means, a second side fence portion for being positioned above said second side member of said frame of said platform means, and an end fence portion for being positioned above said second end member of said frame of said platform means;

g) pivot means for allowing said fence means to move between a first position with said fence means extending upwardly from said support member of said platform means to help secure said load onto said support member, and a second position with said fence means remote from said support member of said platform means to allow said load to be easily moved onto or off of said support member; and h) lock means for locking said fence means in said first position; said lock means including a boss member for being fixedly attached to said platform means, a socket means for being fixedly attached to said fence means and for receiving said boss member when said fence means is in said first position, and pin means for extending through said socket means and said boss member to lock said fence means to said platform means in said first position.

6. A utility rack for being attached to a vehicle and for carrying a load, said utility rack comprising:

a) a platform means for supporting said load; said platform means including a support member for receiving said load; said platform means including a rigid frame, said frame including a first side member having a first end and a second end, a second side member having a first end and a second end, a first end member having a first end attached to said first end of said first side member and having a second end attached to said first end of said second side member, and includes a second end member having a first end attached to said second end of said first side member and having a second end attached to said second end of said second side member;

b) a first arm member having a first end for being attached to said vehicle and having a second end;

c) a second arm member having a first end for being attached to said vehicle and having a second end;

d) first slide means for slidably attaching said second end of said first arm member to said platform means;

e) second slide means for slidably attaching said second end of said second arm member to said platform means;

f) fence means attached to said platform means for surrounding at least a portion of said support member; said fence means including a first side fence portion for being positioned above said first side member of said frame of said platform means, a second side fence portion for being positioned above said second side member of said frame of said platform means, and an end fence portion for being positioned above said second end member of said frame of said platform means;

g) pivot means for allowing said fence means to move between a first position with said fence means extending upwardly from said support member of said platform means to help secure said load onto said support member, and a second position with said fence means remote from said support member of said platform means to allow said load to be easily moved onto or off of said support member; and h) lock means for locking said fence means in said first position; said lock means including a first boss member for being fixedly attached to said platform adjacent said first end of said first side member of said frame of said platform means, a first socket means for being fixedly attached to said first end of said first side fence portion of said fence means and for receiving said first boss member when said fence means is in said first position, first pin means for extending through said first socket means and said first boss member to lock said fence means to said platform means in said first position, a second boss member for being fixedly attached to said platform adjacent said first end of said first side member of said frame of said platform means, a second socket means for being fixedly attached to said first end of said second side fence portion of said fence means and for receiving said second boss member when said fence means is in said first position, and second pin means for extending through said second socket means and said second boss member to lock said fence means to said platform means in said first position.

* * * * *